June 23, 1936. V. M. CHATFIELD 2,045,518
DISTILLATION TOWER
Filed March 4, 1936
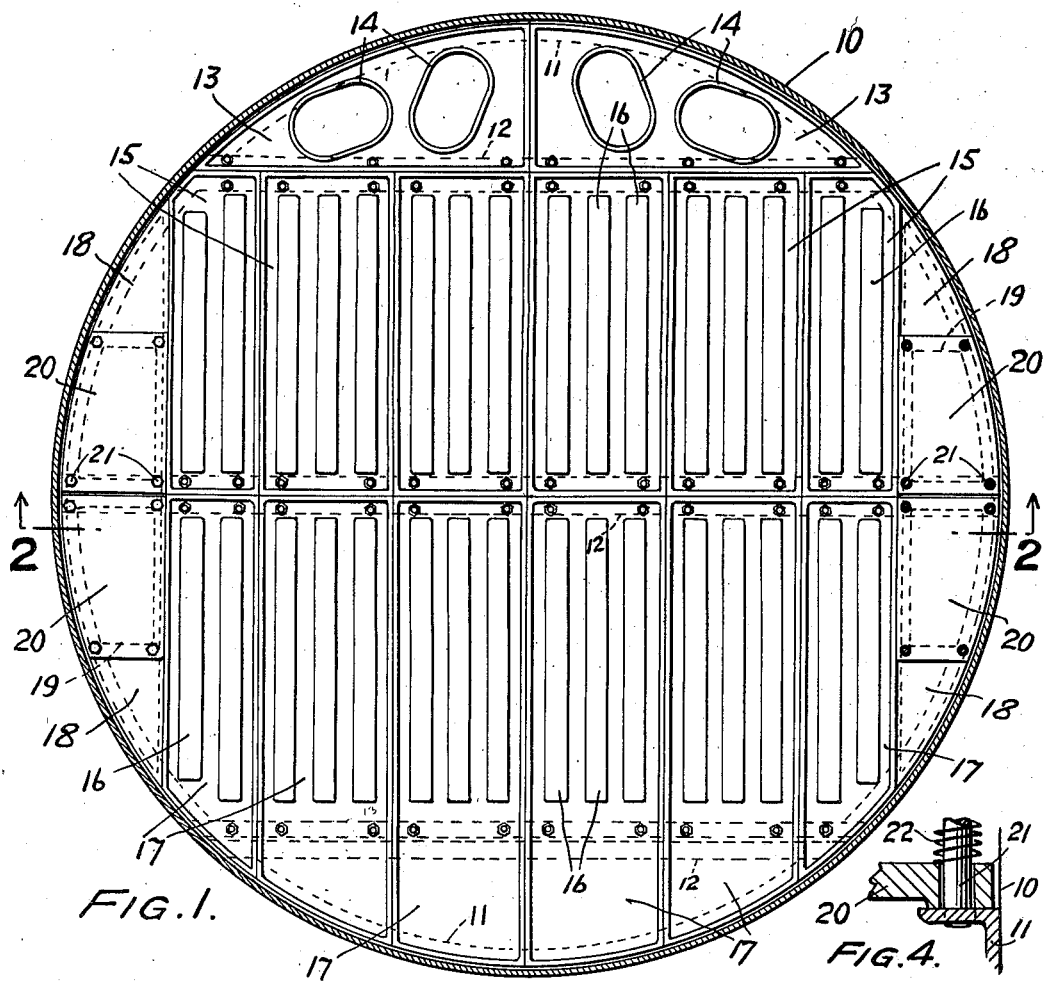
FIG.1.
FIG.4.
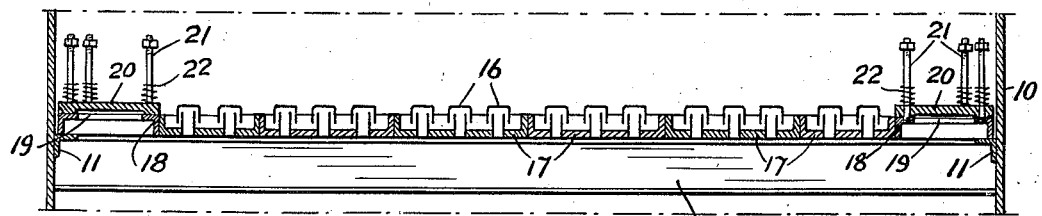
FIG.2.
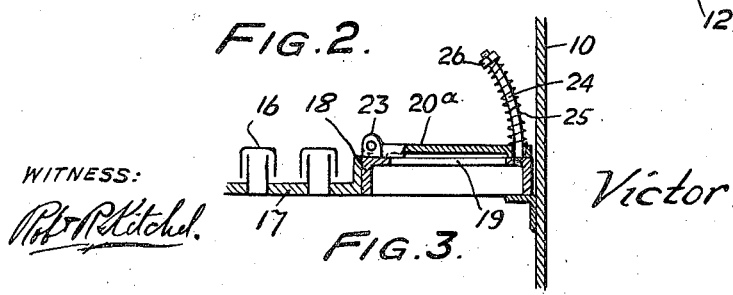
FIG.3.
WITNESS:
INVENTOR
Victor M. Chatfield
BY
ATTORNEYS

UNITED STATES PATENT OFFICE 2,045,518

DISTILLATION TOWER

Victor M. Chatfield, Lansdowne, Pa., assignor to Sun Oil Company, Philadelphia, Pa., a corporation of New Jersey Application March 4, 1936, Serial No. 67,055

6 Claims. (Cl. 261—114)

The present invention relates to distillation towers, and more particularly to bubble trays for use in such towers. As is well known, distillation is carried out in modern refineries by heating the oil in a pipe still and then passing it into a bubble tower wherein separation of liquid and vapors occurs and fractional condensation of the vapors is effected by passing them upwardly through the tower and contacting them with downwardly flowing liquid reflux at a multiplicity of levels by means of bubble trays. The towers are often operated under pressures above atmospheric, as there is considerable pressure drop through such towers depending on the construction and design of each tower. Usually the pressure drop from tray to tray will average between .2 and .4 pound per square inch.

When a bubble tower is shut down for a periodic cleaning it is first cooled and then washed thoroughly with water after which it is purged, for instance with flue gas; the trays are then manually scraped and cleaned after which the tower is again thoroughly washed with water. The towers are usually provided with means for draining all residual liquid (water or oil) from the trays down pipe seals, etc. in order to facilitate cleaning when shutting down, and for draining all water therefrom when ready to go on stream again. It frequently happens, however, despite all possible precautions, that a pool or pools of water will be left standing in portions of the tower, either on the trays or seal pans or in the bottom of the tower, due to the drainage openings being clogged by the dirt removed during the cleaning operation. Water is also sometimes present in the bottoms of the tanks from which the charging stock is withdrawn, and is pumped with the hot oil into the tower, or it may be present in oil lines leading to the tower due to the cleaning operations, and will be picked up by the first oil to enter the tower and be carried into the tower. When water is present in the tower it is covered by the oil, due to its higher specific gravity, and is heated by the oil flowing into the tower or by the vapors contacting the underside of the trays when the water happens to be thereon. Due to the fact that the water is usually quiescent, it appears to take on a certain amount of superheat, and on being slightly agitated it quickly vaporizes occupying as steam a volume many times its original volume as water. Such rapid generation of steam causes a greater excess of pressure than the vapor uptakes in the trays are capable of relieving, thus causing the trays to be lifted bodily from their supports and hurled against the supports for the tray next above. Inasmuch as the trays are formed from cast iron sections they are frequently broken. In any case, as soon as a tray or trays are raised from their supports, it is necessary to shut down the unit and replace the trays to their proper positions. Since the vapor uptakes in the trays cannot be enlarged to provide for the release of such rapidly generated pressures, even though they are only of the order of a few pounds per square inch above the pressure normally existent within the tower, as the vapor uptakes, bubble caps, and depth of liquid on the trays must be very carefully calculated in order to provide proper fractionation, and since it would be structurally impossible to build trays heavy enough to withstand sudden increases in pressure, refiners have heretofore regarded such shutdowns as an inescapable evil. Bolting the trays down does not overcome this difficulty, as the trays will either be torn loose from their fastenings, being thereby broken, or the tower itself will be shaken violently. Cases have been known where towers have been loosened on their foundations by the mere vaporization of extraneous water in the tower and the tower shell severely strained.

It is an object of the present invention to obviate the above difficulties by providing relief means on each tray whereby pressures generated below or between the trays will be relieved without disturbing the trays. A better understanding of the invention will be had by referring to the accompanying drawing, of which:

Fig. 1 is a plan view of a tray embodying the present invention;

Fig. 2 is a section taken on line 2—2 of Fig. 1;

Fig. 3 is a view of a modified construction of cover plate; and

Fig. 4 shows a detail of the cover plate retaining means.

In the drawing, 10 designates a portion of a tower shell (shown in section on the drawing). 11 designates an angle iron support running substantially completely around the periphery of the tower and welded thereto for the purpose of supporting the tray. 12 represents I-beams lying crosswise of the tower which aid in supporting the trays, and to which the trays are bolted. 13—13 represent cast iron tray segments into which downtake pipes 14 are fitted and secured by means not shown in the drawing. These two sections, together, form a segmental section which will hereinafter be termed the liquid outlet section. 15 designates a series of ported sections lying next to the liquid outlet section, the ported sections having bubble caps 16 lying over the longitudinal ports therein, and being fixed (by means not shown) to the tray proper. 17 designates ported sections similar to 15, except that the extreme end thereof near the tower shell is not ported, but is left blank to serve as a liquid inlet section, into which the pipes 14 from the tray immediately above empty. The ports in sections 17 are covered by bubble caps 16, similar to those on the sections 15. 18 designates segmental filler trays, the level of which is above the normal level of the liquid on the trays. Each of the filler trays 18 has two openings 19 formed substantially as truncated sectors, each of these openings being covered by a plate 20. At each corner of each opening is a bolt 21 and the cover plates 20 are drilled so as to be slidable on the bolts 21. Above each plate and on each bolt 21 is a buffer spring 22.

The plates 13, 15, and 17 are usually of cast iron and are formed with upstanding flanges around their peripheries. The filler trays 18 are also of cast iron and are formed with downwardly extending flanges. The flanges of the sections 13, 15, 17 and 18 are drilled and bolted to each other by bolts not shown, so as to form a rigid unitary circular structure which rests upon the supports 11 and 12, the space between the tray and tower shell 10 being filled with packing material (not shown), usually consisting of asbestos rope on top of which is placed a metallic ring. The trays are bolted to the supports 12 by means of the bolts 13.

A modified form of filler tray construction is shown in Fig. 3, in which the cover plate 20a is hinged at the inside edge of the filler tray, as shown at 23. There is provided in each filler tray a hole at each outside corner through which a curved bolt 24 is passed, a spring 25 being provided between the nut 26 on the bolt 24 and the cover plate, exerting a constant pressure against the cover plate. The cover plates 20 and 20a are provided with means for sealing the openings in the filler trays 18. This means may be a circumferential ridge on the bottom of each cover plate, or it may take the form of deformable packing material, either on the tray 18 or affixed to the filler plate, or it may take the form of a circumferential ridge as just described, and packing material both.

In operating, the plates 20 are normally urged against the filler trays 18, either by their own weight, or by means of springs such as 25. The weight of the cover plate or the spring normally urging it against the tray being so designed as to furnish sufficient load to maintain the cover plate in position for pressures beneath the tray up to approximately the normal pressure drop from tray to tray. It is therefore apparent that, when a shot of water passes into the tower, or water lying in the tower vaporizes and causes an excess pressure either below the trays or between any two trays, the cover plates 20 will be raised and vent the excess vapors before any damage can occur to the tray.

In a tower in which the ordinary features of construction are employed, as shown in the drawing, the sections for a bubble plate 14′ 4″ in diameter would be formed of cast iron, and would normally be ½″ thick. Such a tray would weigh, considering only the net metal area and deducting the area of the vapor up-takes and downspouts, .293 pound per square inch, and when in service would have oil thereon weighing approximately .078 pound per square inch, giving a total average weight of .371 pound per square inch. The pressure drop from tray to tray would average .286 pound per square inch, which would leave a net retaining force of only .095 pound per square inch. In other words, if the pressure beneath the tray were increased over .371 pound per square inch, the tray would be lifted from its supports. It is therefore apparent that a slight increase in pressure due to the rapid vaporization of any water present would easily raise the tray and ram it against the supports of the tray next above. For instance, a tray 14′ 4″ in diameter would have a net metal area of 20,152 square inches, and should the sudden vaporization of water create an excess of pressure of the order of 5 pounds per square inch, the total force tending to lift the tray would be 100,760 pounds. When the weight of a single tray (5900 pounds) is considered, it is readily seen how destructive a force would be applied to the tray.

It is obvious that excess pressure cannot be readily relieved through the vapor uptakes and their bubble caps, since the areas of these uptakes and the dimensions of the bubble caps must be maintained within extremely close limits in order to provide proper contact between the vapors and the reflux liquid during normal operation.

By means of the present invention the filler tray sections of the tower are converted into pressure relief valves which serve to vent excess vapors from tray to tray without disturbing the trays or their operation.

Having now described my invention, what I claim and desire to protect by Letters Patent is as follows:

1. A bubble still tray comprising a bubble cap section, a liquid inlet section, a liquid outlet section, and a filler section having means therein to relieve excess pressure generated beneath the tray which cannot be relieved through the bubble cap section.

2. A bubble still tray comprising a bubble cap section, a liquid inlet section, a liquid outlet section, a blank ported section and port covers thereon adapted to be raised by any excess pressure generated beneath the trays which cannot be relieved through the bubble cap section.

3. A bubble still tray comprising substantially rectangular central bubble cap section, a liquid inlet section substantially segmental in shape bounding one side of the rectangular bubble cap section a liquid outlet section substantially segmental in shape bounding the opposite side, and segmental sections adjoining the remaining two sides of said rectangular bubble cap section and having ports therein, and covers for said ports, said covers being normally urged against the edges of the ports and being adapted to be raised to relieve any excess pressure generated beneath the tray.

4. In a bubble tray, filler tray sections of substantially segmental shape, openings in said sections being formed substantially as truncated sectors, and covers seated upon and normally closing said openings, guide rods upon which said covers are vertically slidable, and buffing means adapted to limit the upward movement of the covers, whereby any excess pressure generated beneath the tray will unseat the covers and vent the vapors causing such excess pressure.

5. In a fractionating tower, a tray therein, a bubble cap section comprising the major part of the area of the tray, a filler section comprising a minor part of the area of the tray and provided with a port of substantial area, and a cover seated loosely upon the filler section and adapted to maintain the port closed against pressure beneath it due to pressure drop through said bubble cap section during the normal operation of the tower but adapted to be lifted by excess pressure beneath the trays and thereby act as a pressure relief valve to vent excess vapors without disturbing or imposing substantial strain upon the bubble cap section.

6. In a fractionating tower, a tray therein, a bubble cap section comprising the major part of the area of the tray, a filler section comprising a minor part of the area of the tray and provided with a port of substantial area, and a cover seated loosely upon the filler section and adapted to maintain the port closed against pressure beneath it due to pressure drop through said bubble cap section during the normal operation of the tower but adapted to be lifted by excess pressure beneath the trays and thereby act as a pressure relief valve to vent excess vapors without disturbing or imposing substantial strain upon the bubble cap section, and buffer means to yieldingly arrest the upward movement of the port cover produced by the specified excess pressure.

VICTOR M. CHATFIELD.